United States Patent [19]

Bestler et al.

[11] Patent Number: 4,807,023
[45] Date of Patent: * Feb. 21, 1989

[54] MAPPING METHOD FOR IMPULSE PAY PER VIEW SYSTEM

[75] Inventors: Charles B. Bestler, Oak Park; Gordon E. Reichard, Jr., Rolling Meadows; Semir Sirazi, Chicago, all of Ill.

[73] Assignee: Zenith Electrics Corporation, Glenview, Ill.

[*] Notice: The portion of the term of this patent subsequent to Jul. 5, 2005 has been disclaimed.

[21] Appl. No.: 760,219

[22] Filed: Jul. 29, 1985

[51] Int. Cl.$^4$ .............. H04M 11/08; H04M 15/00; H04N 7/10; H04H 9/00

[52] U.S. Cl. .................... 358/86; 379/105; 379/246

[58] Field of Search ............ 179/2 A, 5.5, 18 FH; 358/84, 86, 349; 455/2, 4, 5; 379/102, 104, 105, 127, 142, 246

[56] References Cited

U.S. PATENT DOCUMENTS

| | | | |
|---|---|---|---|
| 3,920,908 | 11/1975 | Kraus . | |
| 4,163,254 | 7/1979 | Block et al. | 358/84 X |
| 4,460,922 | 7/1984 | Ensinger et al. | 358/122 |
| 4,536,791 | 8/1985 | Campbell et al. | 358/86 X |
| 4,554,418 | 11/1985 | Toy . | |
| 4,558,464 | 12/1985 | O'Brien, Jr. | 358/86 X |
| 4,590,516 | 5/1986 | Abraham | 358/86 |
| 4,742,513 | 5/1988 | Reichard, Jr. et al. . | |
| 4,755,872 | 7/1988 | Bestler et al. | 358/86 |
| 4,763,191 | 8/1988 | Gordon et al. | 358/86 |

FOREIGN PATENT DOCUMENTS

| | | | |
|---|---|---|---|
| 103438 | 3/1984 | European Pat. Off. | 358/86 |
| 217308 | 4/1987 | European Pat. Off. . | |
| 85/03830 | 8/1985 | PCT Int'l Appl. | 358/84 |
| 87/04884 | 8/1987 | PCT Int'l Appl. | 358/86 |

OTHER PUBLICATIONS

The Yankee Group, "Cable and the Telcos: From Confrontation to Détente," Jun. 1983, pp. 162-167.
A. F. Bulfer, "Dial-A-View", Talk Given at the Motion Picture Industry Seminar, Dec. 3, 1984, Los Angeles, CA.
Bulfer et al, "A Trial of a National Pay-Per-View Ordering and Billing System," NCTA Technical Papers, Cable 86, Dallas, Tex., Mar. 1986.
Zenith Electronics, "Advanced New Cable TV Technology Developed for Impulse-Pay-Per-View," Jun. 3, 1985, Press Release Published by Zenith Electronics, Corp., Glenview, Ill., Obtained From Dialog Database.
Sirazi et al, "Comparative Study of Hybrid IPPV Implementations" presented at Cable 85, Las Vegas, Nev. (Jun. 3, 1985).

Primary Examiner—Keith E. George

[57] ABSTRACT

An IPPV technique is provided for a cable system having one-way addressable converters. Each of several central offices in a metropolitan area will provide ANI information representing the cable subscriber's phone number and a code representing the cable event to be viewed or cancelled. The data is sent asynchronously to a respective telephone communication unit located at the central office. This telephone communication unit (TCU) does some buffering, eliminates unnecessary data, and sends data synchronously to a telephone communication controller (TCC) located at the cable headend station. The TCC will acknowledge the data. There will be several TCCs located at the cable headend station corresponding to the several central offices who may give telephone service to the cable operator's subscribers. All of these TCCs at the headend station are coupled through a multiplexer to a system controller. Each TCC provides intermediate processing which converts the subscriber's telephone number into binary. The multiplexer provides buffering, flow control, and arbitration among various TCCs. The multiplexer adapts to data flow conditions. The system controller receives data from each subscriber, locates a corresponding home terminal unit address, examines the password and other information, and maps the two digit program identification which was entered by the subscriber into an authorization code. It then authorizes the home terminal units in accordance with the IPPV requests by transmitting the subscriber's cable address and a new authorization code in the vertical blanking interval, generates the commercial transaction, and downloads the transaction to a billing system.

28 Claims, 12 Drawing Sheets

OSC & SELECT LOGIC

BUS INTERFACE CONTROL & BUFFER LOAD LOGIC

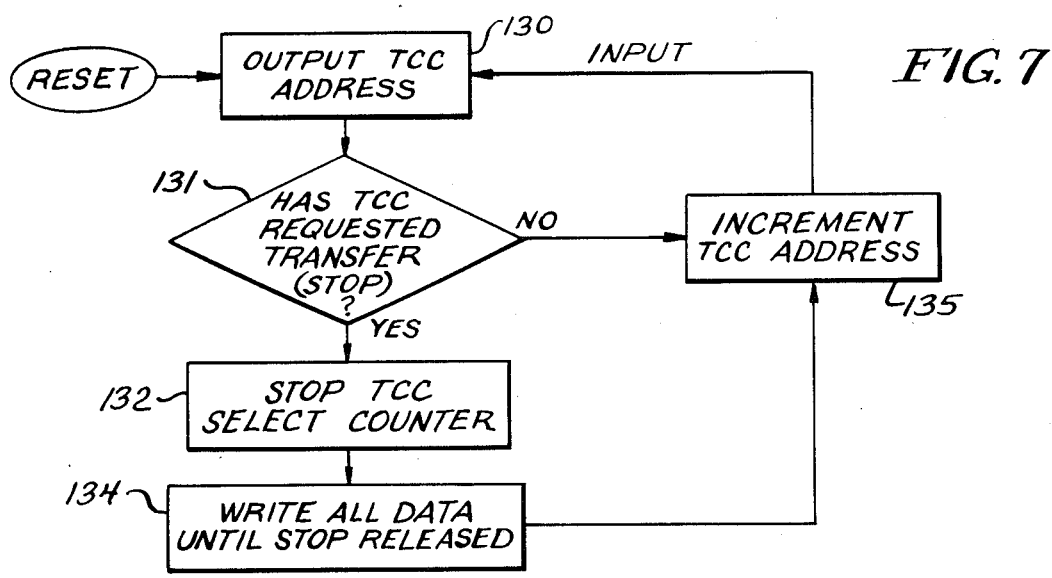
FIG. 7
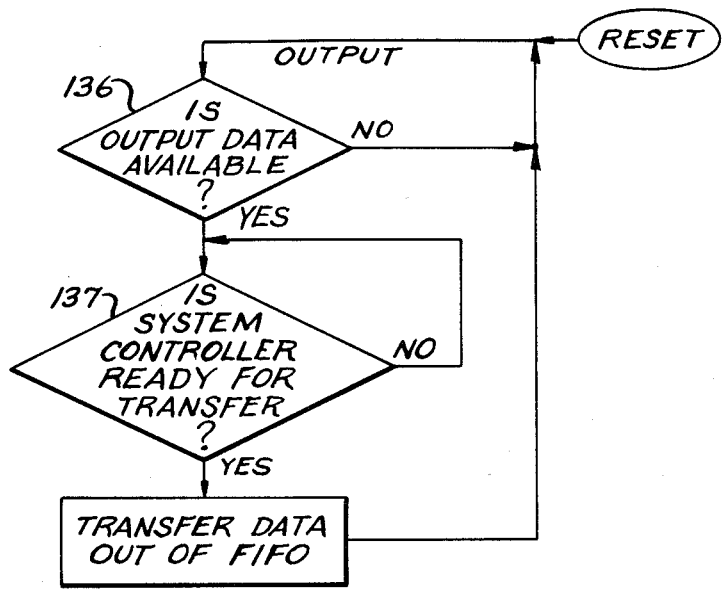
FIG. 8
FIG. 9
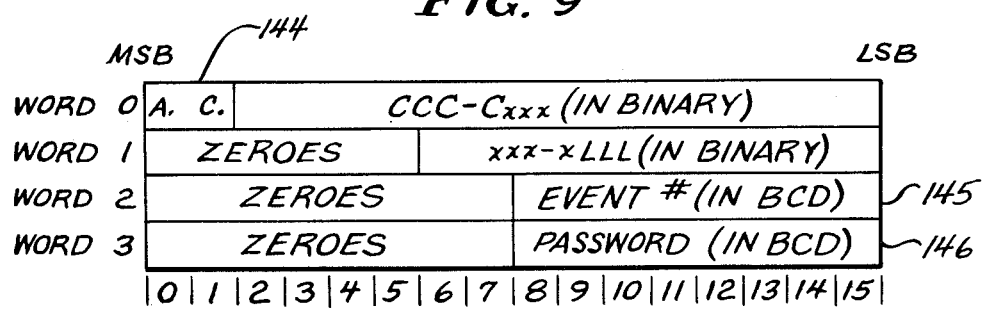

MAPPING METHOD FOR IMPULSE PAY PER VIEW SYSTEM

BACKGROUND OF THE INVENTION

The present invention relates to cable television and particularly to a technique whereby a cable subscriber can send a request via telephone to the cable operator to receive only a selected cable program. This is known as an "impulse pay per view" system.

The preferred embodiment of the present invention is compatible with one-way addressable CATV systems. Prior to describing the invention, it will be useful to have a rudimentary understanding of a typical one-way addressable CATV system. In use, a cable operator at a "headend" station receives signals via satellite, microwave, and super trunks, encodes the signals, modulates them, and provides them to the cable plant. The cable plant is a distribution network typically carrying up to 80 channels or more over a distance of up to 20 miles or so to various subscribers. Each of the cable subscribers is provided with a one-way addressable converter (also called a decoder) which is connected to the cable and to a television receiver or monitor. The basic function of the converter is to interface the cable signals with the subscriber according to authorization codes received from the headend. The subscriber will select a channel containing a program desired to be viewed. The converter will determine whether that channel or program on the channel is authorized for viewing by the subscriber. If so, the converter descrambles the selected signal provided by the cable operator and provides a descrambled signal to the television receiver or monitor. The scrambling may, for example, be done by sync suppression wherein sync information is randomly suppressed, as well as video inversion.

To achieve the foregoing system, use may be made of the vertical blanking interval, e.g., line numbers 10, 11, 12 and 13, or an out-of-band data channel during which information can be transmitted by the headend station to the subscribers or any selected subscriber. Each converter has a respective unique address code illustratively having 20 binary bits so that over one million subscribers can be individually addressed by the headend. Additionally, each converter typically includes a random access memory (RAM) which is capable of storing 20 bits, for example. Each of the stored bits is representative of a service or channel which may be subscribed to. Typically, at installation, the RAM is loaded with all zero bits. When the subscriber chooses the services he wants, that information will be entered as data in a subscriber data base. The subscriber data base is accessed by a system controller at the headend station which is capable of addressing any or all of the converters in the field. The system controller also communicates with a billing and management computer.

More particularly, in this example the system controller transmits a selected 20 bit address code (sometimes referred to as an "identification code") followed by an associated authorization code using each of line numbers 10, 11, and/or 12 in the vertical blanking interval. Each converter receives the 20 bit address code, but only one converter will decode it as matching its own unique address. Following the transmitted 20 bit address code are the five bits of the authorization code. These five authorization bits will be loaded into a proper location in the RAM, the location having been determined by information from line 13 in the prior field. The RAM in the converter will illustratively contain 20 bits arranged in four groups which may be called row A, row B, row C, and row D. Illustratively, the five bit authorization code will be loaded into one of the rows of the RAM. Line number 13 of the vertical interval is used to transmit a "program tag," a "market code," and further information to the converters in the field. The market code is used to prevent a converter from being taken from one cable market to another market. The transmitted program tag is used to identify a particular channel or program and is compared in the addressed converter with the stored authorization bits to establish whether that converter is authorized to descramble the corresponding program material. Illustratively, this is done by performing a logical AND operation between the 5 bit program tag transmitted on line 13 of the channel which has been selected by the subscriber with the content of a selected row of the RAM. The result of this logical operation will indicate to the converter whether the selected channel or program on the channel has been authorized to be descrambled by the converter. It will be appreciated that each of the channels transmitted by the cable operator has its own respective program tag. This particular system has exceptional versatility in that the contents of the RAM at any subscriber's converter can be changed instantly via the system controller through the transmission of the appropriate address code during the vertical blanking interval followed by updated information for storage in the RAM. Moreover, there can be tiers of authorization wherein various programs on a given channel will be authorized for some subscribers but not for others, depending on the service to which they have subscribed. For further information about one such addressable system, refer to Ensinger and Hendrickson U.S. Pat. No. 4,460,922, whose disclosure is hereby incorporated, which patent is owned by Zenith Electronics Corp.

To date, the market penetration of cable systems has been on the order of only 50 percent. Some television owners prefer not to pay the monthly charges for cable service to receive one or more of the packages or services provided by the cable operator. These non-subscribers, however, may be willing to pay the cable operator for only an occasional program. Such type of service is called "pay per view." In order to achieve this and to provide control over billing, the cable operator must have information regarding what programs are desired by various subscribers. In an addressable CATV system of the type described above, for example, a particular subscriber's converter may be updated so that it will descramble a given program—once it is determined that the subscriber is willing to pay for that program. This can be done by having the subscriber telephone the cable operator in advance of the program to be purchased, mail a postcard, or communicate by some other means.

The problem with this type of service, however, is that it precludes impulse purchases and simultaneous response from the time the pay-per-view subscriber determines he wishes to purchase a particular program and the time it is actually viewed by him. It would be considerably more advantageous to permit a subscriber to obtain immediate results by, for example, pushing a button. This would alert the cable operator to a request for service. The system controller at the headend station immediately would change the contents of the RAM at that subscriber's converter to permit the selected program to be descrambled. This is called "impulse pay per view" (IPPV) service.

The problem facing the industry is how to provide a system permitting IPPV service. In 1975, the Federal Communications Commission mandated that all cable systems being installed would be required to have two-way communications capability. This would permit interaction between the subscriber and the headend station. To date, about 20 percent of installed systems are capable of two-way communications, and of these only about one-half have active two-way communication. With two-way communication, the subscriber can use his home terminal or other unit to communicate with the headend station and achieve IPPV. The problem, however, resides in providing a mechanism for other subscribers served by one-way cable systems, which constitute the vast majority, to have IPPV service.

For cable subscribers without two-way cable systems, a hybrid system is required for impulse pay per view service. This involves a telephone request by a subscriber for a PPV cable event followed by delivery from the cable operator headend station to the individual subscriber of a new authorization level permitting the PPV cable event to be descrambled.

The problem with hybrid systems using the telephone is substantial. The telephone system in a given city or community includes one or more central offices, each communicating with up to about 50,000 telephone subscribers. Each of the several central offices communicates with the others by trunk cables. The headend station of the cable operator will be located within a region serviced by one central office. When cable subscribers telephone for pay per view service, their telephone central offices will route all of the telephone calls to the one central office servicing the headend station. Too many telephone requests at the same time to the cable operator can cause the telephone central office to "crash" due to excessive requests for physical telephone connections between numerous telephone subscribers and a single cable operator headend station. This problem is common to all hybrid systems, whether a manual telephone system or an automatic dialing system is used.

Further problems attend manual call-in systems and auto-dialing systems. The manual call-in systems are labor intensive, require long processing and holding time, have limited capacity, are not impulse in nature, and have lower penetration. They also involve possible human error. Auto-dialing systems have an advantage over manual systems, except that there is the additional expense of in-home installation of the automatic dialer.

To avoid overloading on the telephone system, one solution to providing IPPV service for one-way addressable cable systems would be to refrain from making physical telephone connections between the cable subscribers and the headend station through the various central offices. To achieve this, a new system based on automatic number identification passing referred to as "ANI passing" has been developed. ANI passing is an upgrade achieved by adding software to some central offices or by adding hardware to others, depending on their existing capabilities. In ANI passing, the central office of the telephone company will collect information based on each subscriber telephone call and pass it on to other equipment.

Thus, when a cable subscriber intends to make an IPPV request and picks up his telephone (takes it "off-hook"), a dial tone is issued to the subscriber's premises by the telephone company, and the telephone number is automatically identified, as customary within the telephone company. Now the cable subscriber can enter information using the telephone. Typically, to place a phone call, seven digits (or ten, if an area code is needed) are entered. To use ANI passing, however, some prescribed sequence of digits is used. This can take virtually any form. For example, the subscriber may enter "*85" or any other prescribed NNX number (exchange number) and then some number of digits, such as four further digits. In general, however, the total number of digits need not be seven, so long as some prescribed subscriber-entered information alerts the telephone company central office not to make a physical connection between the telephone subscriber and whatever location is identified by the code which follows the reserved block of codes which follows the NNX (or *85 signal). After dialing the NNX number, for example, the cable subscriber will provide further information on the telephone by sending illustratively four digits. Hence the telephone transmission to the central office may take the following form: NNX-YVVZ. In this illustrative example, the code represented by NNX activates the ANI passing system at the central office. The remaining four digits YVVZ identify what the subscriber wants to do. Illustratively, the Y digit is used to identify the cable company. In any given metropolitan area, there will be fewer than ten different cable operators, so the one digit (Y) will be able to identify the cable operator uniquely. Illustratively, the next two digits represented by VV identify the event or cable television program which the cable subscriber wishes to purchase. Next, the Z digit may represent a password which is useful for security purposes. For example, within a given household where a cable television system has been installed, parents may, through the use of a password, prevent access by children to certain types of pay per view programming. Alternatively, the Z digit can be used for other purposes. In using *85, five digits can be entered by the cable subscriber to his telephone, for a total of, for example, seven digits preceded by one special character. One of the digits may identify the cable company, two of the digits may identify the cable event to be purchased (or canceled), and two digits may be used as a password. It will be understood that these are purely illustrative, and that wide variation can occur.

As mentioned, the NNX or *85 message tells the telephone central office that it need not make a physical connection. This avoids overburdening the telephone plant. In response to receiving such an ANI transmission, the receiving telephone central office will collect and store data. Then, it will communicate by the system of the present invention with the cable headend station which has been "telephoned" and provide it with various information, including the telephone number of the cable subscribers who called, the user entered data, and various other information. In an area served by plural cable companies, the equipment at the telephone company central offices will send data, using the present invention, to the plural cable companies.

The object of the present invention is to provide a system which will receive information from the telephone company central offices and implement the impulse pay per view requests by cable subscribers in a satisfactory manner.

A related object of the invention is to provide a system having the ability to receive data from the telephone companies as fast as the information can be provided using the ANI passing systems.

Another object of the present invention is to permit the authorizations of the subscribers to be checked in real time.

A further object is to translate the telephone number of the cable subscriber (provided by the telephone company) into a cable subscriber code at a fast rate.

BRIEF DESCRIPTION OF THE DRAWINGS

In describing the various aspects of the present invention, reference will be made to the accompanying drawings wherein:

FIG. 7 describes the inputting of data to the multiplexer from the TCC;

FIG. 8 describes the outputting of data from the multiplexer to the system controller;

FIG. 9 shows the message format of the data sent from the multiplexer to the system controller;

DESCRIPTION OF THE PREFERRED EMBODIMENT

Figure 1:
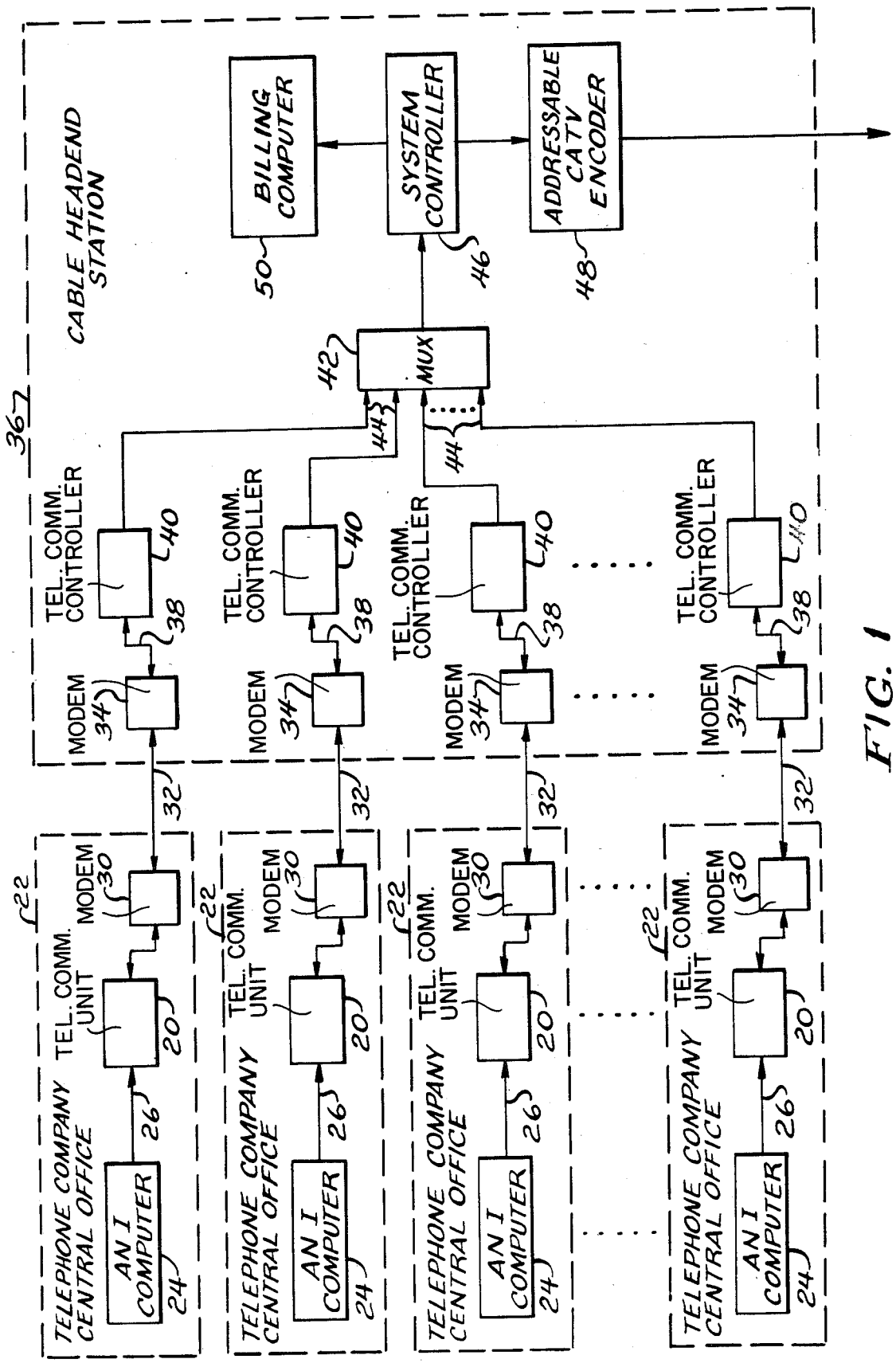
FIG. 1 is a block diagram of a system according to the present invention showing plural central offices and a headend station.

FIG. 1 shows a block diagram of a system according to the present invention. The preferred embodiment of the invention is the Zenith PHONEVISION system. As shown, the system comprises a plurality of telephone communication units (TCUs) 20 each located at a corresponding telephone company central office 22. Several central offices 22 are shown in FIG. 1 to indicate the several central offices of any metropolitan area. In the preferred embodiment of the present invention there may be as many as sixteen central offices. Also located at the telephone company central office is an automatic number identification (ANI) computer 24. The ANI computer is provided by the phone company and is activated upon receipt of a telephone call from a customer utilizing a special ANI telephone code. The ANI computer then provides specific information to its TCU on a cable 26.

Coupled to each telephone communication unit 20 is a corresponding modem 30. Modems 30 are coupled via leased telephone lines 32 or other communication channels to corresponding modems 34 located at a cable headend station 36. Each modem 34 is coupled by a cable 38 to a respective telephone communication controller (TCC) 40. The TCCs 40 are in turn coupled to a multiplexer 42 by a bus 44. Multiplexer 42 selects which one of the TCCs corresponding to the various telephone company central offices will supply data to a system controller 46. The system controller in turn is coupled to a cable TV encoder 48 as well as a billing computer 50.

In order to utilize the impulse pay per view system of the preferred embodiment described herein, a cable television subscriber would tune his addressable cable television decoder to the desired channel. The cable subscriber would then use his telephone to enter the ANI telephone code and then four or more digits. Two of the digits entered by the cable subscriber signify the particular IPPV cable event the subscriber wishes to view. Two of the other digits for illustrative purposes constitute a password number or could be used to identify which of a plurality of encoder units the subscriber wishes to enable for the desired cable event.

The telephone company central office 22 serving the cable subscriber's telephone area will be alerted by the ANI code so that when it receives the call, it will transform the "dialed" phone number (called the "destination telephone number") and other data into the so-called bulk calling line identification (BCLID) format by using the ANI computer. It will be understood that other protocols can be used by the telephone company, and that the present invention is not limited to the specific protocol adopted. In any event, the telephone company central office will not connect the incoming call from the cable subscriber to its local switch. Thus, the telephone company central offices will not become overburdened with the incoming calls from numerous cable subscribers who may all be calling on impulse to purchase a particular cable event.

The ANI computer at the telephone company central office will send the BCLID data (using seven bit ASCII code) to the TCU 20 located at the central office. The data is sent serially at 1200 baud in RS-232 format. The BCLID message contains ASCII characters representing the seven digit "destination telephone number," the ten digit origination telephone number, as well as considerable other data such as carriage return and line feed, a BCLID input/output message identifier, numerous ASCII spaces, the time of day in hours, minutes and seconds, the terminating line status and the calling line status indicator. The data sent in the telephone company's BCLID format is shown in Table I.

The "destination telephone number" carries the information entered by the cable subscriber. This will include the cable event which is to be purchased and the password. Ordinarily, this will comprise the last four of the seven digits entered by the subscriber, although any number of digits could be entered, and of these, any number could be dedicated to identifying the program to be purchased, a password, an identifier of which particular converter box at the subscriber's premises is to be used, and any other information deemed necessary or desirable by the cable company.

TABLE I

Format of BCLID Message Sent
By ANI Computer 24 to TCU 20

<cr-lf> BCsaabbccssddddddddsoooooooooosfsgs <cr-lf>

<cr-lf>   All messages start and stop with carriage

TABLE I-continued

Format of BCLID Message Sent
By ANI Computer 24 to TCU 20

<cr-lf>BCsaabbccssdddddddsoooooooooosfsgs<cr-lf>

|    | return line feed |
|----|------------------|
| BC | BCLID I/O message identifier |
| s  | ASCII "space" |
| aa | Hours (24 hour format) |
| bb | Minutes |
| cc | Seconds |
| ddddddd | 7-digit "destination telephone number" |
| oooooooooo | 10-digit origination telephone number |
| f  | Terminating line busy, idle status, ("0" = idle, "1" = busy) |
| g  | Calling line DN multi-status indicator |

This data is sent by the ANI computer 24 to its corresponding TCU 20 asynchronously without handshaking, and can be a continual data stream.

The TCU 20 must be able to receive and transmit the data as fast as the ANI computer 24 can send it. To promote speed, each TCU 20 strips away unneeded data and temporarily stores the remaining data in a buffer. The stored data is then transmitted synchronously to the cable headend station using a telephone line 32. Preferably, a contracted synchronous data link control (SDLC) protocol is used for transmitting the data from each TCU 20 to its corresponding TCC 40 at the cable headend station. After the data has been transmitted to the headend station, the TCU 20 waits for an acknowledgment message from the headend TCC 40 before transmitting the next data packet. If no acknowledgment or a negative acknowledgment message is received, TCU 20 retransmits the previously transmitted data packet. The TCU 20 provides for error free transmission to TCC 40 with no data loss. Since much of the unnecessary information of Table I is removed, as will be described, by the TCU 20, and due to the buffering occurring at each TCU 20, each TCU 20 is able to operate at a rate fast enough to keep up with ANI computer 24. Each TCU 20 also provides for conversion of the BCLID data received from the phone company to the modified SDLC protocol format.

Figure 2:
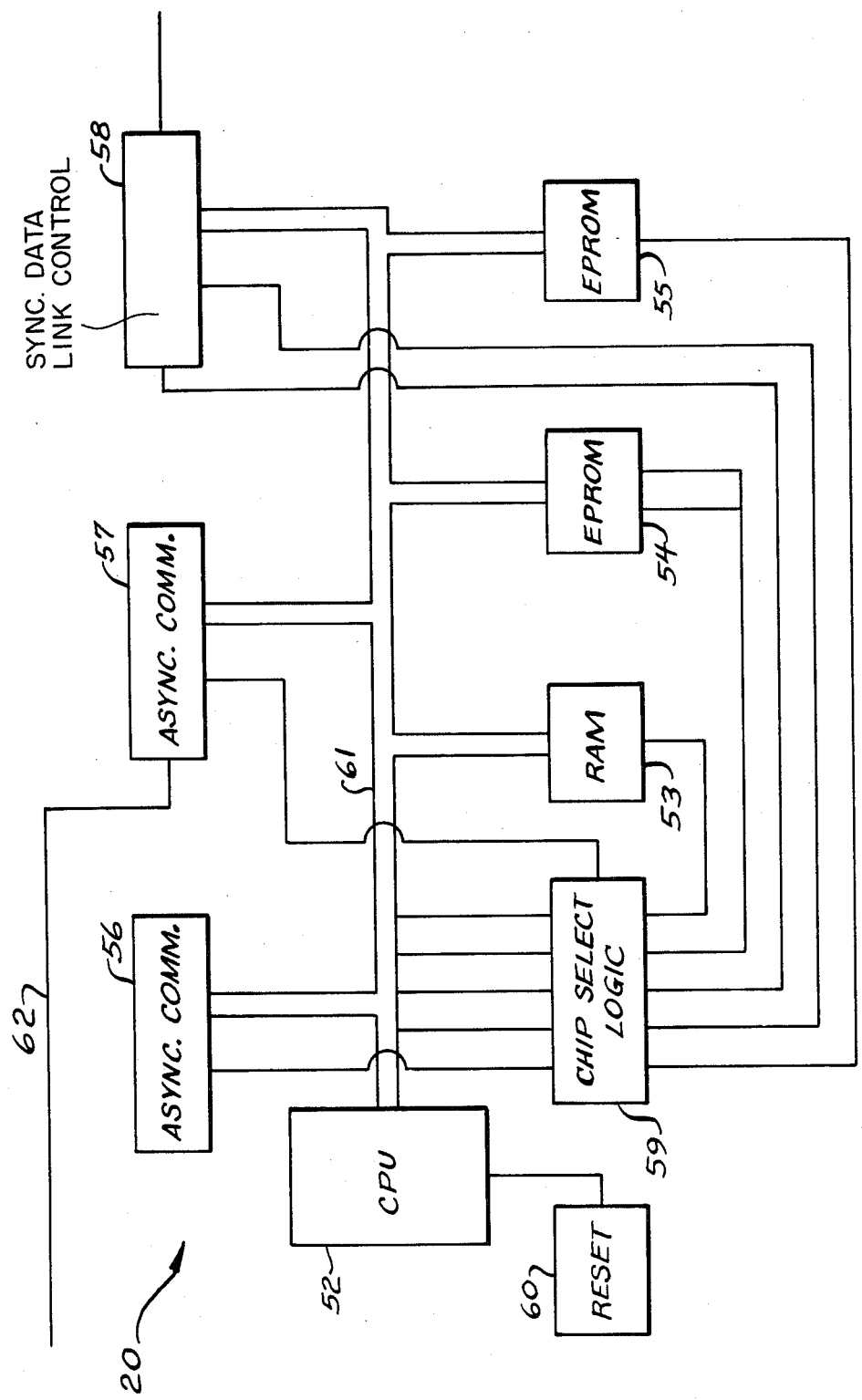
FIG. 2 is a block diagram of one of the several telephone communication units (TCUs)

A block diagram of a TCU 20 located at one of the telephone central offices is shown in FIG. 2. It includes an Intel 8085 central processing unit ("CPU") 52, a 4 K×8 static RAM 53, a 16 K×8 EPROM 54, a 4 K×8 EPROM 55, two Intel 8250 Asynchronous Communication Elements 56, 57, an Intel 8273 programmable HDLC/SDLC protocol controller 58, chip select logic 59 and watchdog reset circuitry 60. A sixteen bit address and eight bit data bus 61 provide communication among the various components of TCU 20. The serial data from the telephone office ANI computer 24 is applied to a serial data input pin of communication element 57 by a line 62 which is coupled to cable 26 through a line receiver (not shown). The equipment on this board, according to the preferred embodiment, has two asynchronous channels and one synchronous channel.

The CPU 52 in the preferred embodiment illustratively operates at four megahertz. Its instruction code is stored in EPROM 54. The EPROM 55 may contain look-up tables. RAM 53 is used to buffer data packets, for stack purposes and for program use. Chip select logic 59 is used to determine whether the read or write operation is required of the memory mapped devices and to determine the exact device being addressed.

As mentioned, once the data from the telephone office ANI computer 24 is received, TCU 20 strips away unwanted data. The data that is kept is the seven digit (illustratively) "destination telephone number" entered by the cable subscriber (which includes the data the cable event to be purchased), the ten digit phone number of the cable subscriber, the terminating line status and the calling line indicator. These nineteen characters are ASCII characters, and are temporarily stored or buffered in RAM 53 to await transmission to the corresponding TCC 40 at cable headend station 36.

Appendices I and II of U.S. Pat. No. 4,755,872 by Bestler et al are hereby incorporated by reference.

Figure 3:
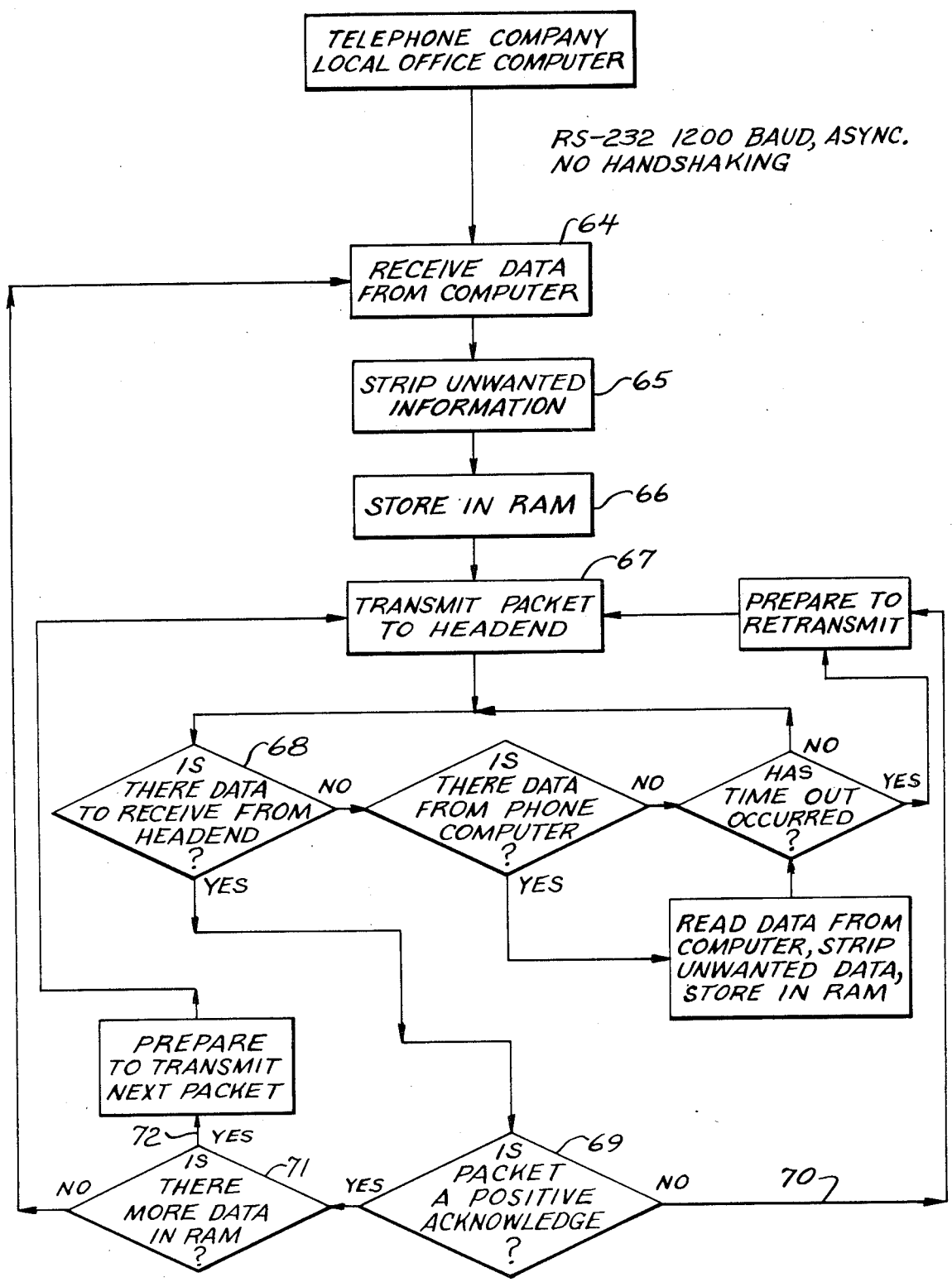
FIG. 3 is a flow chart of the TCU software.

FIG. 3 contains a flow chart of the software which controls the inputting of data from the telephone office ANI computer 24 and the outputting of data to the cable headend TCC 40. A listing of the TCU software is contained in Appendix I printed in U.S. Pat. No. 4,755,872. Referring to FIG. 3, after data is received from ANI computer 24 at block 64, unwanted data is stripped, temporarily stored, and then sent in packets to the headend unit as shown at blocks 65, 66 and 67. Then TCU 20 determines at decision diamonds 68 and 69 whether a positive acknowledgment has been received from the headend. If not, retransmission of the data packet occurs, as indicated by route 70. If there is stored data in RAM 53, determined at diamond 71, further data packets are sent to the headend, as indicated by route 72. Otherwise, data continues to be received, as always, and put into a buffer (RAM) until processed.

The nineteen ASCII characters sent by TCU 20 to its TCC 40 are sent via a line using a contracted SDLC protocol which is reflected in Appendix I printed in U.S. Pat. No. 4,755,872. Briefly, however, the SDLC protocol is modified to preserve the package format, zero bit insertions, and the frame check sequence ("FCS code"), with all else eliminated. The data is sent synchronously, serially, at 1200 baud, and is RS-232 compatible. Handshaking is used, so that for every packet sent from the TCU 20, a positive acknowledgment is required in the preferred embodiment before the next packet is transmitted. Table II shows the illustrative message format of the data sent from a TCU 20 to its TCC 40. Table III shows the illustrative acknowledgment message sent from a TCC 40 to its corresponding TCU 20.

TABLE II

Message Sent From
The TCU To The TCC

[address] [packet ID]NNXDDDDAAACCCCLLLYZ[FCS] [FCS]

[ ] denotes an 8-bit quantity
address = FF hex
NNX = ANI identifier, e.g., *85 or 1st 3 digits of destination phone no.

D = User data
A = Area Code
C = First 4-digits of subscriber's phone number
L = Last 3-digits of subscriber's phone number
Y = Terminating line status (line busy or not)
Z = Calling line indicator (public line or private branch exchange)
[FCS] = Frame check sequence for error checking

TABLE III

Acknowledgment Message
Sent From The TCC 40 To The TCU 20

[address] [packet ID] [acknowledgment byte] [FCS] FCS]

acknowledgment byte = C3 hex for NACK
= A5 hex for ACK

TABLE III-continued

Acknowledgment Message
Sent From The TCC 40 To The TCU 20

[address] [packet ID] [acknowledgment byte] [FCS] FCS

[ ] denotes an 8-bit quantity

It will be understood that these processes occur at each of the several central offices of the telephone company serving the cable companies areas. The system as described so far collects data in real time. The collected data are the requests of subscribers, and this is achieved using a system compatible with ANI passing, Data is sent from multiple telephone central offices to a cable headend station. The data provided includes the subscriber's telephone number and his request, which is couched in the destination telephone number.

Turning now to the cable headend station 36, the basic functions of each TCC 40 in the preferred embodiment are to receive data packets from the several telephone central offices 22, store the data temporarily, perform some conversions into binary and BCD, reformat the data, and communicate it quickly to system controller 46 via temporary storage in multiplexer 42. As seen in FIG. 1, there are several TCC units 40 corresponding to the several telephone central offices 22.

Figure 4A:
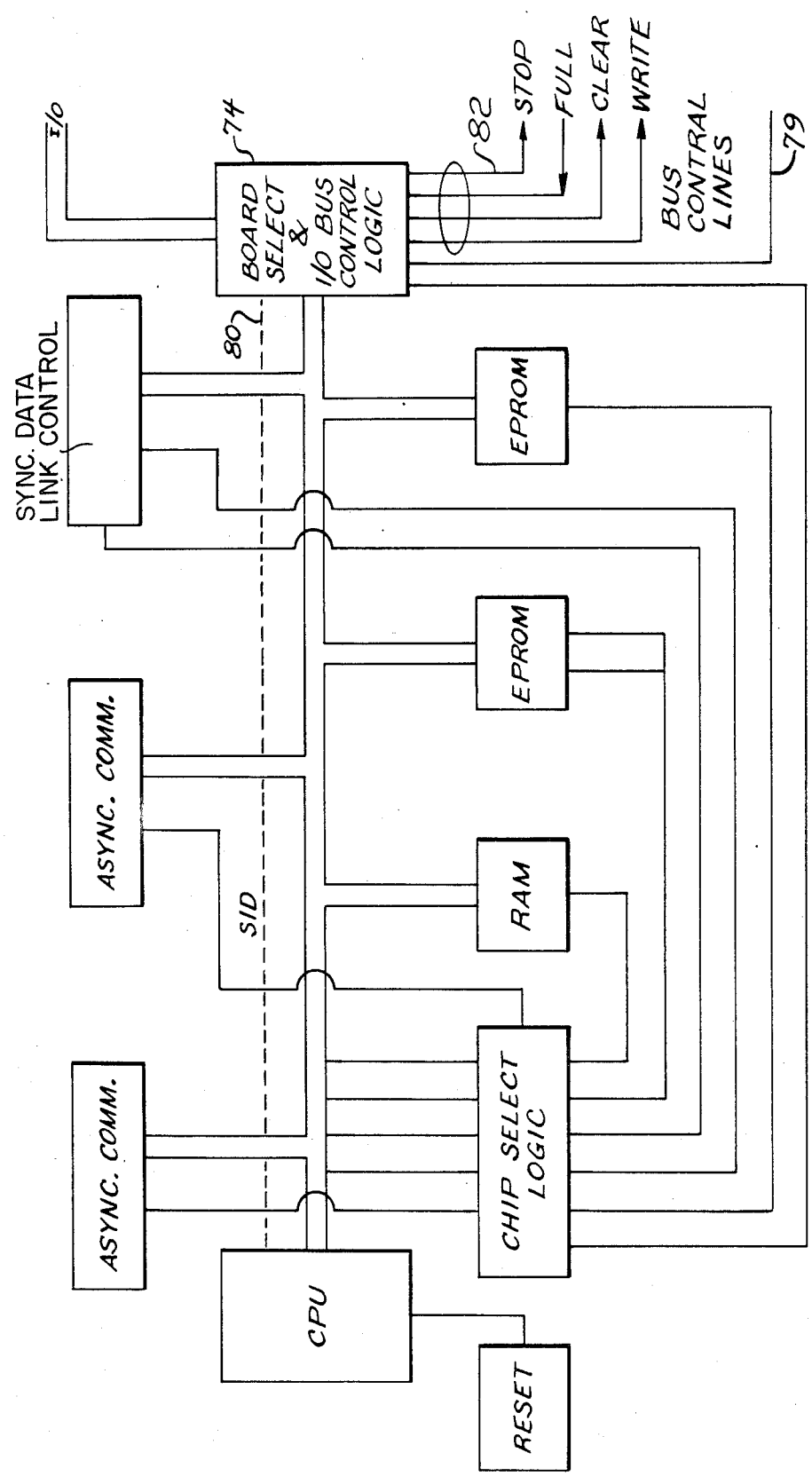
FIGS. 4A and 4B are diagrams of the telephone communication controller (TCC) located at the cable headend station.

A block diagram of an illustrative TCC 40 located at the cable headend station 36 is shown in FIG. 4A. The same components are used in the TCC 40 as in the TCU 20, and in the same configuration. As with TCU 20, this board has asynchronous and synchronous capability. In TCC 40, the synchronous ports of the Intel 8250 chips are used. Each TCC 40 additionally includes a board select and I/O bus control logic circuit 74 shown more particularly in FIG. 4B. This circuitry illustratively comprises two Intel 8255 programmable peripheral interface (PPI) chips represented by 75, an eight bit transceiver 76, a four bit magnitude comparator 77 and a four pole DIP switch 78. Switch 78 is used to set the select address of the particular TCC. For example, the first TCC would have all four poles of the switch arranged so that each outputs a logic "0." The switch outputs are connected to one side of the magnitude comparator, and the other side of the comparator is coupled to four board select lines 79 coupled to multiplexer 42. When comparator 77 sees a match in its two inputted values, it generates a match signal that is inputted via a serial input data (SID) line 80 to the CPU of FIG. 4A alerting it that the TCC board is being offered the opportunity by multiplexer 42 to output data.

The I/O control logic part of circuit 74 handles the outputting of eight bit parallel data sent to multiplexer 42. In order to transfer data from TCC 40 to multiplexer 42, a check is made to ensure that multiplexer 42 is ready to receive a data byte. Then transceiver 76 (FIG. 4B) is enabled by the one of PPI chips 75. The data to be transferred is then written into the same PPI chip. If multiplexer 42 is ready, the data byte is strobed into the multiplexer by performing a write operation. Four bus control lines 81, 82, 83 and 84 (CLEAR/RESET, STOP, FULL, WRITE) are used to check if the multiplexer is ready for data and to strobe the data into the multiplexer.

Figure 4B:
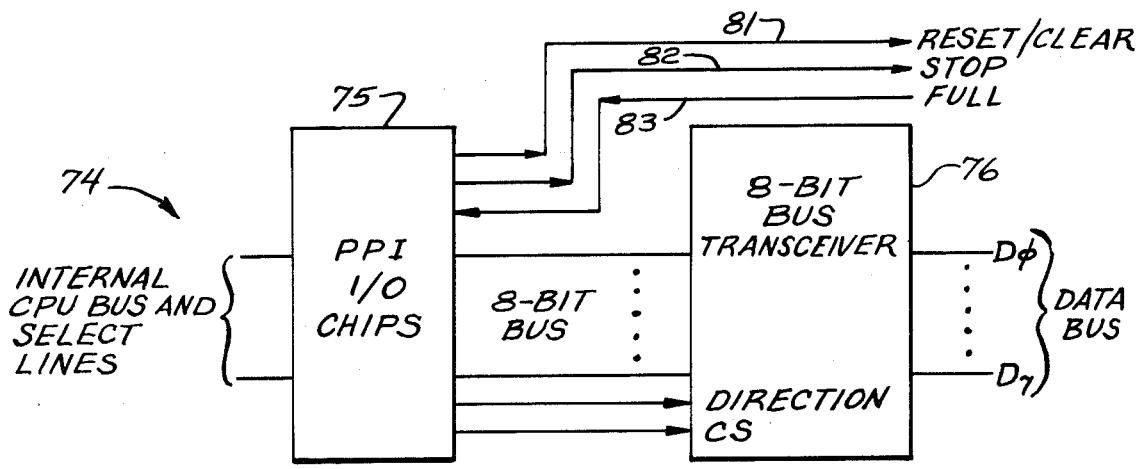
Figure 4B:
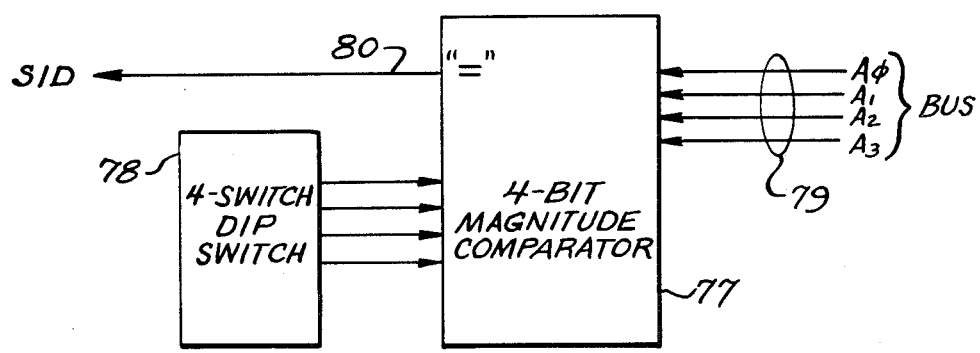
Figure 4C:
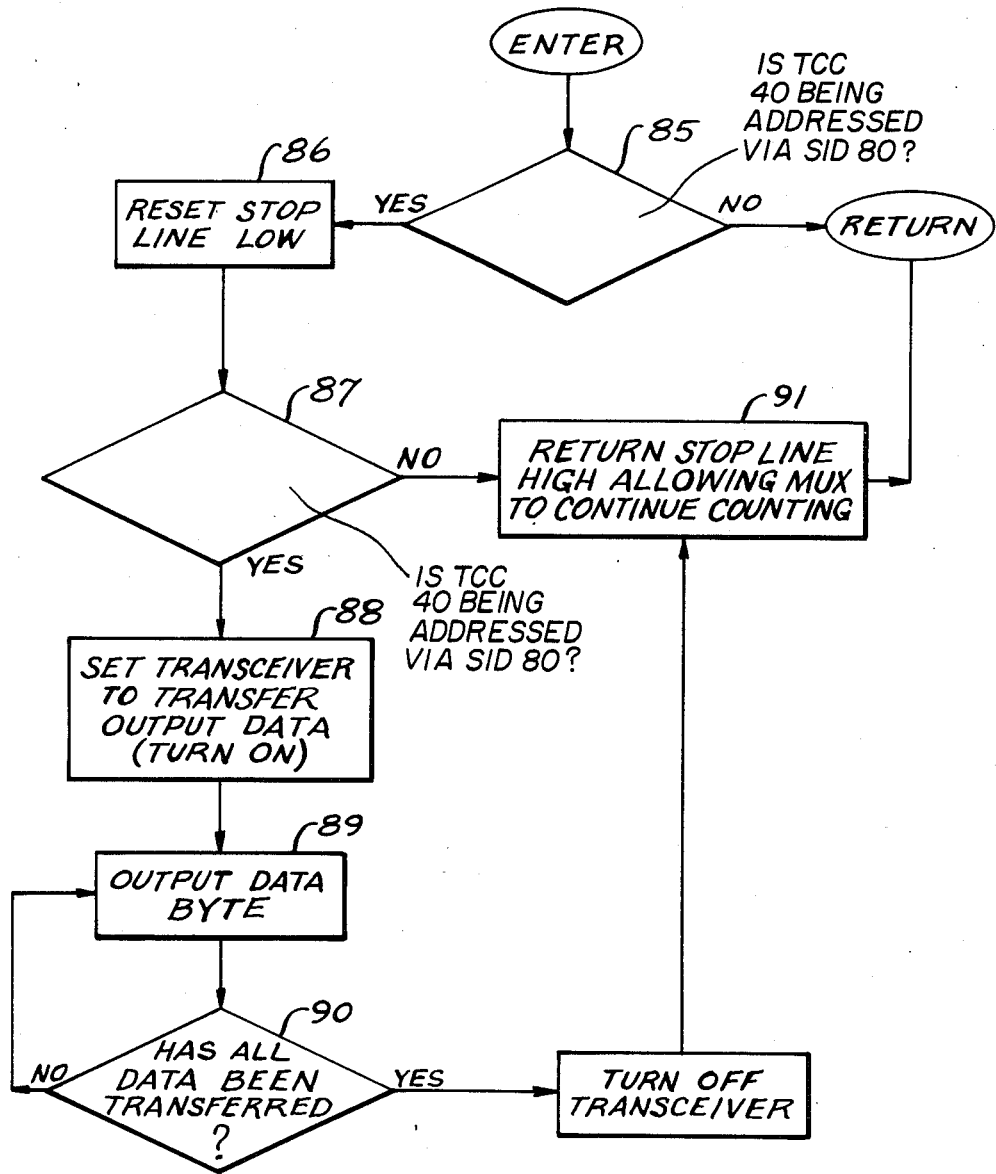
FIG. 4C is a flow chart of part of the TCC operations pertaining to adaptive window multiplexing.

This process can be referred to as part of what is referred to herein as "adaptive window multiplexing" wherein multiplexer 42 addresses in sequence each of several TCCs 40, any of which may or may not have data to output. However, the time allotted to any one TCC is not fixed, as in conventional multiplexing. For the most part, the time taken by any single TCC 40 depends on how much data, if any, needs to be sent from that TCC 40 to multiplexer 42, subject to limitations of the memory used for buffering in the multiplexer, as described infra. Referring to FIG. 4C, multiplexer 42 provides address outputs in sequence. The CPU on each TCC 40 looks for its own address (i.e. the address of its board) being issued by the multiplexer, as indicated by diamond 85. The CPU will know whether it has any data (stored temporarily in RAM) to send. If there is such data, then when the CPU sees its address issue, it will stop multiplexer 42 from progressing to the address of the next TCC in sequence by bringing the STOP line 82 low, indicated at block 86. A short time later (interposed for example by the execution of a few instructions), the CPU on TCC 40 checks to make sure that the address at which multiplexer 42 did stop is indeed the address of this particular TCC 40 (diamond 87). If so, then the CPU will cause a fast data transfer (at a rate of 56K bytes/sec) to the multiplexer (block 88, 89, 90). If the address is wrong, then the CPU will release STOP line 82, and thereby multiplexer 42, and not send data (block 91). This is a double check to ensure that only one TCC 40 sends data to the multiplexer 42 connected to bus 44. In FIG. 4B, bus 44 comprises lines 79 and 81 to 84.

Figure 5:
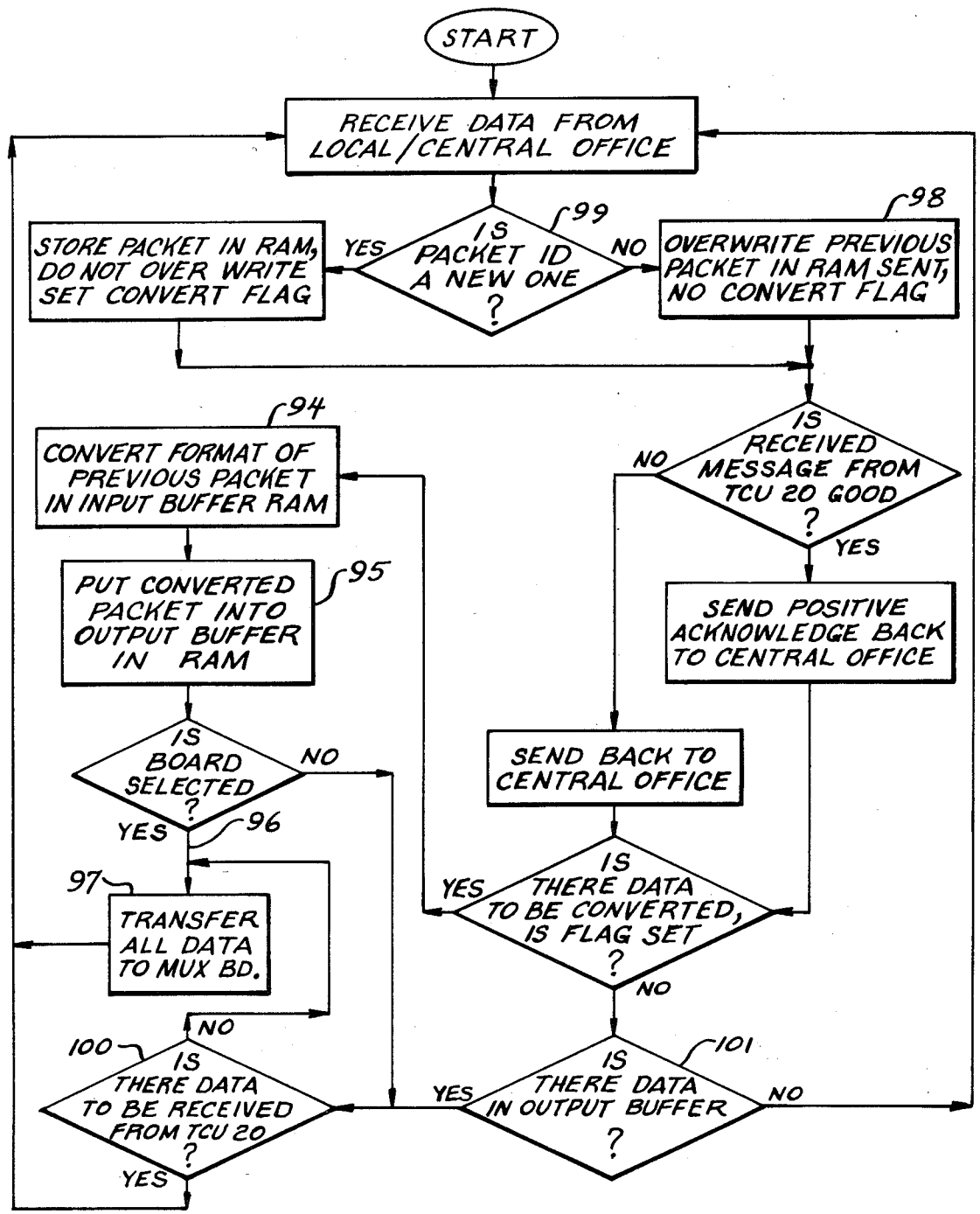
FIG. 5 is a flow chart of the TCC software.

As stated, each TCC 40 has circuitry 74 not included in any of the TCUs 20. While each TCC 40 uses different software than the TCUs, both the TCU and the TCC program is stored in the 16K×8 EPROM, and the 4K×8RAM is used to buffer data, for stack purposes and for program use. The RAM has a portion which is used as an input buffer and another portion used as an output buffer. A flow chart of the software used in the TCC of FIG. 4A is shown in FIG. 5. A listing of the TCC software is contained in Appendix II printed in U.S. Pat. No. 4,755,872.

An important function of each TCC 40 in the preferred embodiment is to convert the ASCII data received from its corresponding TCU 20 into a format more readily usable by the system controller 46, which preferably is a Hewlett-Packard HP-1000 computer. The conversion occurs at block 94 of FIG. 5. The last three digits of the originating phone number (LLL in Table II) are converted into a ten bit binary number. The first four originating digits (CCCC in Table II) are converted into a fourteen bit binary number. The area code of the originating phone number is converted into a two bit binary number (it being assumed that no more than four area code regions are covered by the several telephone central offices which serve the subscribers of the cable operator). The numbers entered by the cable subscriber (DDDD in Table II) representing the cable event and the password are converted into binary coded decimal (BCD) values.

The following example illustrates the novel conversion of a three digit ASCII number to a ten bit binary number. In this example "h" following a number indicates that hexadecimal base is used and "d" indicates that the number is a decimal number. The number to be converted is 0110100 (34h) 0110011 (33h) 0110010 (32h), i.e. 432d. The least significant ASCII digit (i.e., the decimal "2" in the "ones" decimal column) is converted into its binary equivalent by subtracting 30h from the digit: 32−30=02h. The second ASCII digit (the next most significant digit, i.e. the "3" in the "tens" column) is then converted to binary with tens-place weighting. This is converted to binary as in the previous conversion, i.e. 33h−30h=03h. Then the base address of a look-up table stored in an EPROM in TCC 40 for the tens units is added to this value in order to find an address in the look-up table. Then, using this address, a value is obtained from the look-up table. For the number 03h in the tens place, the value read from the look-up table is 1Eh (30d). This is a weighted conversion process. The same weighted conversion process is used for the third ASCII digit, but with different weighting. For 04h (34h-30h) in the hundreds place, the look-up table value is 190h (400d). The hexadecimal values are then combined: 190h+1Eh+02h=1B0h (432d). The conversion process for a four digit ASCII number is similar to the process explained above except, of course, thousands-place weighting is also used.

The following is an example of a conversion of a three digit ASCII value area code to a two bit binary number. In this example "b" following a number indicates that the number is in binary, and again "h" indicates hexadecimal. The area code to be converted is 33 31 32, i.e. 312d. The first ASCII digit is converted into a hexadecimal value by subtracting 30h (32h−30h=02h=00000010b). The second digit is converted in the same manner (31h−30h=01h=00000001b) and this value is rotated left four places (0000001b 00010000b). The first and second values are then combined, and stored in a register of the CPU of the TCC 40 (000000010b 00010000b=00010010b=12h). The third ASCII digit is converted into a hexadecimal value to which the look-up table base address (F0h) is added (33h−30h=03h; 03h F0h=F3h). The sum value is stored in a CPU register. The first and second register pair (F312h) contains the address where the desired two bit value is found corresponding to the 312 area code.

After the ASCII numbers are converted into the appropriate form, they are stored (block 95 of FIG. 5) in the output buffer portion of the on-board RAM of TCC 40 until multiplexer 42 indicates that it is ready to receive data (indicated at 96). In addition, the data to be sent to the multiplexer is arranged in a particular format by the TCC 40 before it is transferred. This is done so that when the data is eventually sent to system controller 46, it will be able to process the data without excessive manipulation. The format of the data sent to multiplexer 42 is shown in Table IV. As can be seen, the data is transferred (block 97) in eight bytes, each byte having eight bits. Note that byte 1 contains the two bit binary area code data as well as the first six binary bits of the converted last four digits of the originating phone number. Note also that zeros are inserted into a portion of byte 3 and in all eight bits of bytes 5 and 7.

TABLE IV

| Data Sent To The Multiplexer From the TCC | |
|---|---|
| BYTE 1: | [(2-bit area code) (1st 6-bits of CCCC)] |
| BYTE 2: | [remaining 8-bits of CCCC] |
| BYTE 3: | [000000(1st 2-bits of LLL)] |
| BYTE 4: | [remaining 8-bits of LLL] |
| BYTE 5: | [00000000] |
| BYTE 6: | [8-bit event #] |
| BYTE 7: | [00000000] |
| BYTE 8: | [8-bit user pass word] |

C = One of the first 4 digits of subscriber's telephone number (now binary)
L = One of the last 3 digits of subscriber's telephone number (now binary)

Several steps are taken in each TCC 40 to ensure the reliability of data. The system overwrites (block 98) any data which is retransmitted (which can occur when a negative acknowledgment issues) (decided at diamond 99). This avoids excessive data. Note also that in this flow chart, if TCC 40 determines that data is to be received from its TCU 20 (diamond 100) then the TCC will postpone a data transfer, even if data is in the output buffer (decided at diamond 101). Thus, inputting has priority over outputting, to ensure against losing data. The rationale is that inputted data and data ready for outputting can both be buffered. The data transfer rate on outputting is so high (illustratively 56K bytes/sec) that some delays can be tolerated to allow for inputting.

Figure 6A:
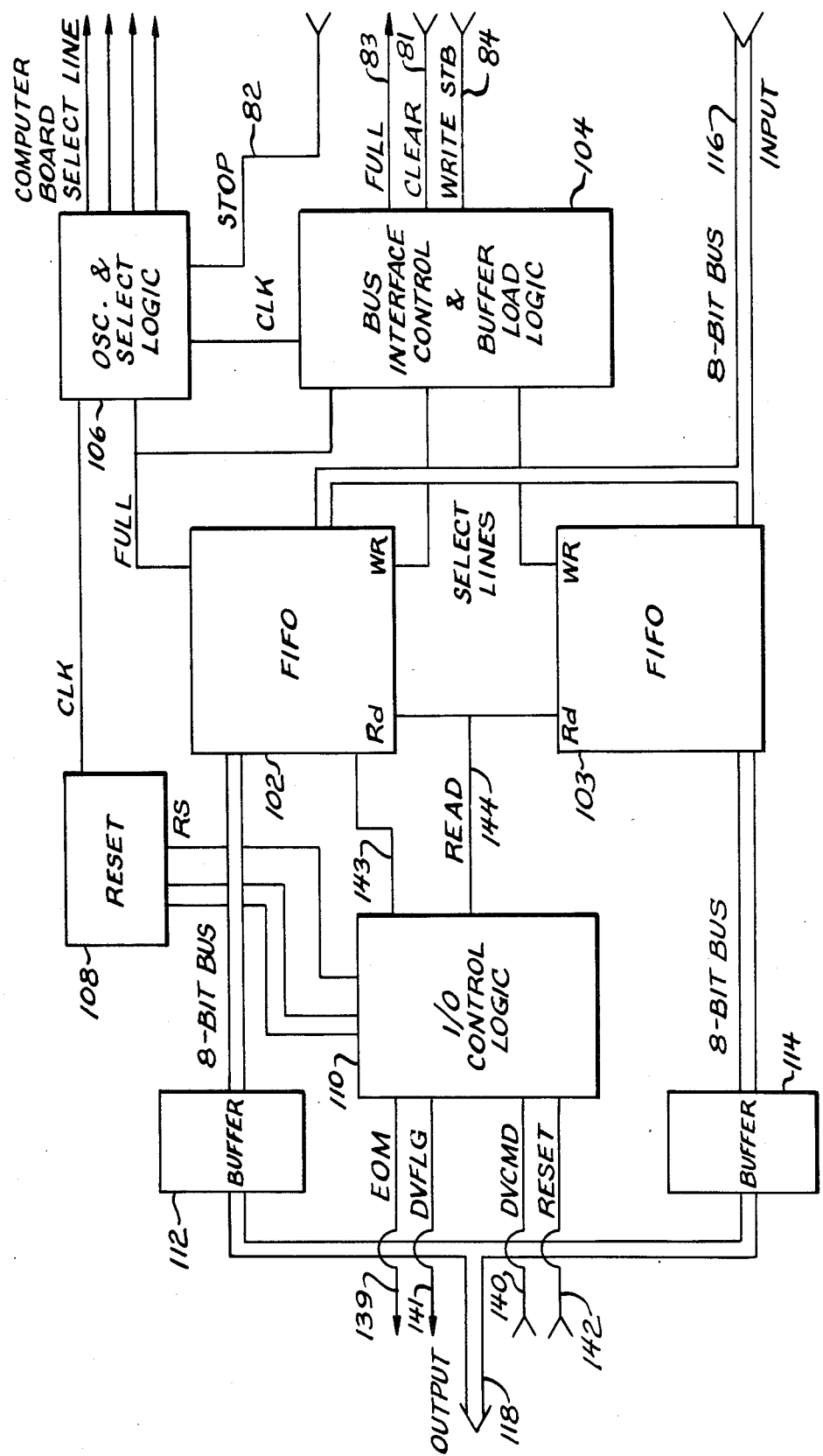
FIGS. 6A, 6B and 6C are diagrams of the multiplexer circuitry.

A block diagram of the preferred embodiment of multiplexer 42 is shown in FIG. 6A. The multiplexer performs three major functions, namely: (1) selecting one of the sixteen possible TCCs to receive data from at any given time, (2) buffering the received data until system controller 46 is ready to receive it, and (3) transferring the buffered data to the system controller.

Multiplexer 42 illustratively comprises two Mostek 4501 first-in, first-out (FIFO) dual port memory chips 102, 103, bus interface control and buffer load logic 104, oscillator and select logic 106, reset circuitry 108, input-/output control logic 110 and two output buffers 112 and 114. Data is received from TCC 40 on an eight bit data bus 116 and transmitted to the system controller 46 on a sixteen bit data bus 118.

Figure 6B:
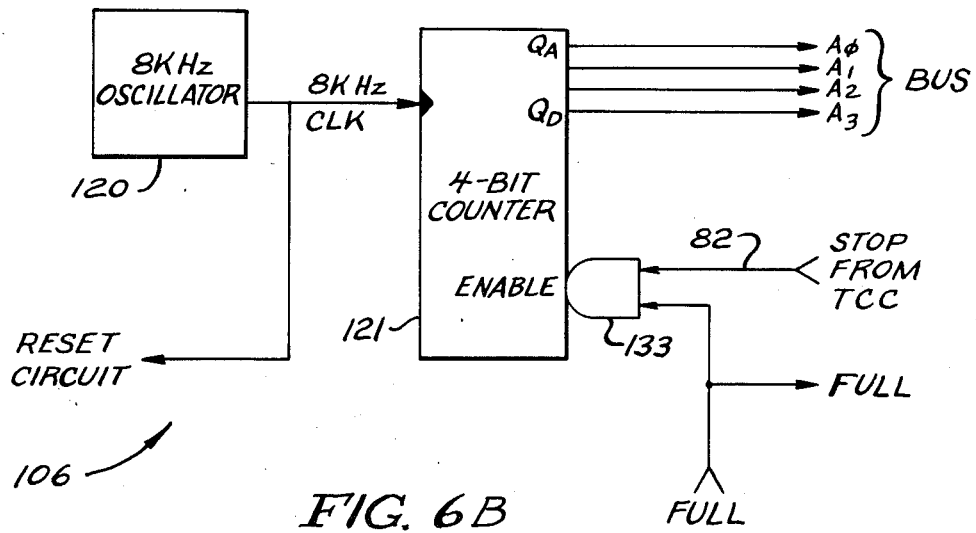

The oscillator and select logic 106, illustrated further in FIG. 6B, selects which one of the TCC units 40 data is to be received from. This oscillator circuitry may comprise a schmitt-trigger inverter with its output looped back to its input through a low-pass filter to form an 8 KHz oscillator 120 (FIG. 6B). This clock signal is used to perform dummy read operations during a system controller request for reset and to increment a board select counter. The board select counter of circuit 106 is illustratively a four bit binary counter 121 with its Enable control coupled to a single stop line 82 which in turn is coupled to all sixteen of the TCC units 40. Counter 121 continually cycles from 0 to 15 until halted by any of the TCC 40 requesting a data transfer by taking stop line 82 low. Once the data transfer is completed (i.e., the output buffer portion of the RAM in the TCC of the addressed TCC has been emptied), stop line 82 is returned high by such TCC 40, and counter 121 is allowed to resume its counting in order to address the next TCC in sequence. As shown in FIG. 5, if there is no data in the output buffer of the addressed TCC (decision diamond 101), then such TCC will not seize the opportunity to write data onto the eight bit bus 116 (FIG. 6) coupled to multiplexer 42. Instead, such TCC 40 will continue receiving and processing synchronously sent packets of data from its TCU 20 and will permit multiplexer 42 to address the next TCC 40 in sequence. Thus, the length of time or the window during which data is received by the multiplexer from a particular TCC adapts according to the amount of data in the TCC output buffer available at the time for transfer, as part of the adaptive window multiplexing technique.

Figure 6C:
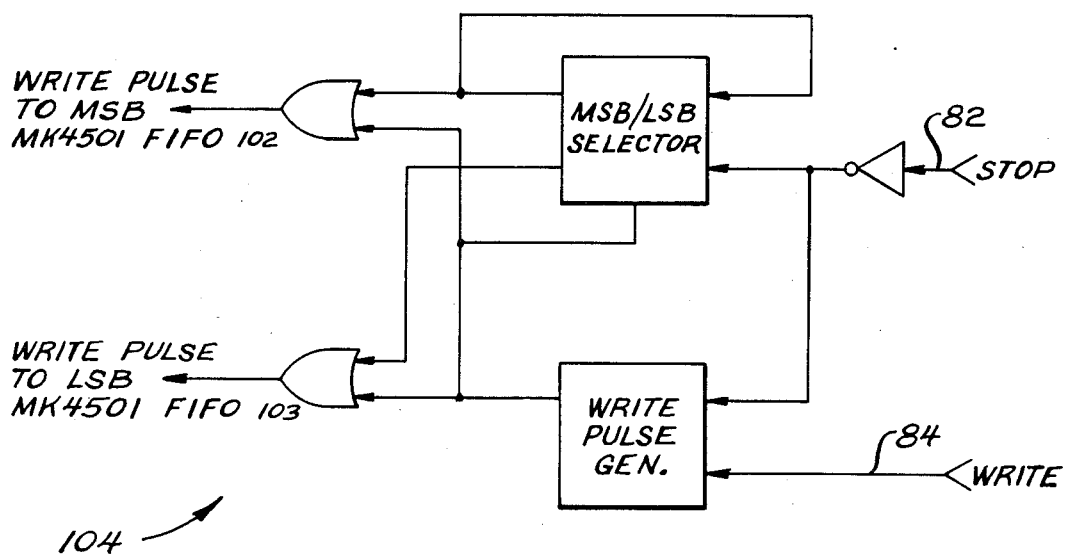

Bus interface control and buffer load logic 104 is responsible for strobing data from a TCC 40 into the correct FIFO buffer 102 or 103. This circuitry is illustrated in FIG. 6C and inserts all of the odd number bytes, i.e. bytes 1, 3, 5 and 7 received from a TCC 40 into FIFO 102 and all of the even number bytes, i.e. bytes 2, 4, 6 and 8 into FIFO 103.

A flow diagram for multiplexer 42 describing the input of the data from the TCCs is shown in FIG. 7. As counter 121 increments, its output is sent on a four line bus (A0, A1, A2, A3 of FIG. 6B), as indicated at block 130 of FIG. 7. Multiplexer 42 then determines whether STOP line 82 has been brought low, at decision diamond 131, for a requested data transfer. If so, counter 121 is stopped (block 132; see also the logic circuit 133 coupled to the Enable input of counter 121 in FIG. 6B). Data is then written into FIFOs 102, 103 (block 134 in FIG. 7), and counting is resumed (block 135).

The outputting of data from multiplexer 42 is shown in the flow diagram of FIG. 8. This includes determining whether multiplexer 42 has any temporarily stored data ready for outputting (diamond 136). Also a determination is made as to whether system controller 46 is ready for a transfer (diamond 137).

It should be noted that the inputting of data to multiplexer 42 is completely independent of the outputting of data from the multiplexer to system controller 46. This allows the telephone central office computers 24 and associated TCUs 20 to operate harmoniously with the system controller 46 at the headend station.

Referring again to FIG. 6A, the input/output control logic 110 performs the handshaking between the multiplexer and the system controller. The handshaking process uses four control lines and corresponding signals: an end of message (EOM) signal on a line 139, a device command (DVCMD) on a line 140, a device flag (DVFLG) on a line 141, and a reset signal on a line 142. Data is transferred from multiplexer 42 to system controller 46 on bus 118 in response to the DVCMD signal, meaning that system controller 46 is ready to receive data, and a FIFO empty (FE) line 143 from FIFO 102 indicating that data is available for transfer, i.e., the FIFO is not empty. At that time, a read line 144 to the FIFO is activated as is the DVFLG line 141 to system controller 46. Once three complete words have been transferred to system controller 46, the EOM control line 139 goes high, signalling that the next word to be transferred will be the last word (Word #3).

System controller 46 preferably is an HP-1000 computer, which reads four words at a time. To ensure against loss of data, the reset signal on line 142 (from system controller 46) forces multiplexer 42 to perform dummy reads from FIFO buffers 102, 103 in order to ensure completion of a four packet transfer. The dummy reads are performed until the EOM signal on line 139 is detected at which time the reset circuitry 108 is disabled and normal read operations are resumed.

Multiplexer 42 converts the eight 8-bit bytes received from each TCC 40 into four 2-byte words which are sent to the system controller at a rate of up to 2M bytes/sec. The conversion process is accomplished by combining the data words stored in the odd byte FIFO 102 with the data words stored in the even byte FIFO 103 to produce a single 2 byte (sixteen bit) word. The sixteen bit words are sent to system controller 46 on the bus 118.

FIG. 9 shows the format of the data words sent by multiplexer 42 to controller 46. The first two bits 144 of Word 0 represent the telephone area code of the cable subscriber originating the IPPV call. The area code was converted into the two bit format by a TCC 40. The number CCCC represents the first four digits (excluding the area code) of the cable subscriber's phone number, converted to binary by the TCC. The three Xs shown in Word 0 and the four Xs of Word 1 are used only to indicate the place of the numbers. The number LLL in Word 1 represents the last three digits of the cable subscriber's phone number, but in binary form. The event 145 and password 146 in Words 2 and 3, respectively, are the numbers entered by the cable subscriber to select a particular cable event. These numbers were converted to BCD (binary coded decimal) by the TCC 40 which processed the data.

By comparing the data format in FIG. 9 with Table IV, it can be seen that Word 0 sent from the multiplexer 42 to the system controller 46 is made up of bytes 1 and 2 sent to the multiplexer from TCC 40. Likewise, Word 1 is made from bytes 3 and 4, Word 2 is made from bytes 5 and 6, and Word 3 is made from bytes 7 and 8. The data sent to system controller 46 is sent in the format shown in FIG. 9 so that the system controller can process the information without extra manipulation. This speeds up the rate at which a cable subscriber's one-way addressable converter is authorized after the subscriber places an IPPV call.

System controller 46 processes the four sixteen bit words of FIG. 9 to identify the cable subscriber, find the subscriber's decoder address, and change the decoder authorization to allow viewing of the program selected by the subscriber (or to implement a cancellation at the subscriber's request). The system controller also initiates proper billing of the transaction by sending information to billing computer 50.

Figure 10:
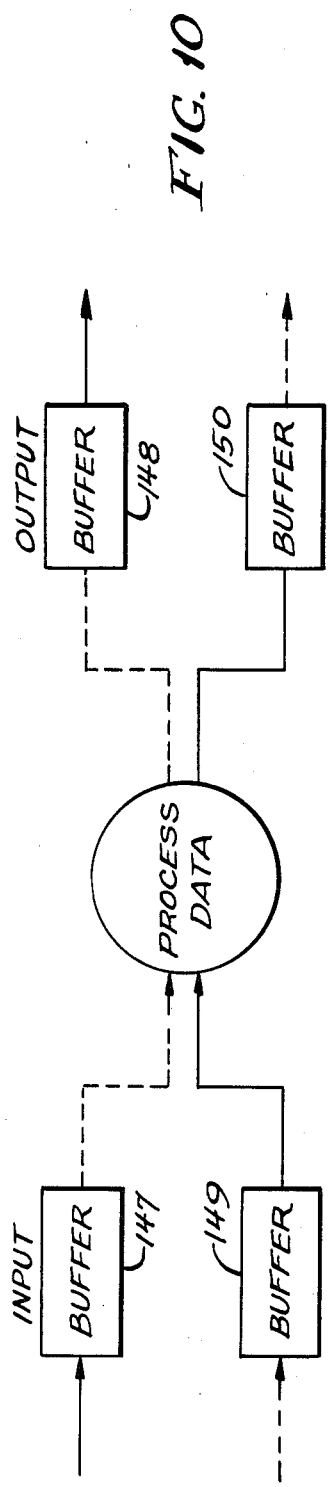
FIG. 10 shows the phase inverted synchronous input/output buffer system used in the system controller.

The four words sent to the system controller are sent directly to the buffer memory of the controller using direct memory access (DMA). In order to process the data sent to it at the fastest possible rate, system controller 46 employs a phase inverted synchronous input/output process using four buffers, two for input and two for output. FIG. 10 shows a diagram of this buffer system. While an input buffer 147 is receiving data from multiplexer 42, an output buffer 148 is outputting data to the cable TV encoder 48 or the billing computer 50. Concurrently, data from an input buffer 149 is being processed and sent to an output buffer 150. These concurrent processes are represented by the solid and broken lines in FIG. 10. When the data in input buffer 149 is exhausted, output buffer 150 receives data from other sources until it becomes filled. During this time, output buffer 148 continues to output data. When buffer 148 no longer has data to output, system controller 46 is interrupted, and the buffer arrangement is inverted. The inputting, outputting and processing after the interrupt is shown by the broken lines in FIG. 10. After the interrupt, data is inputted into input buffer 149; output buffer 150 sends data to cable TV encoder 48 or billing computer 50; and data from input buffer 147 is processed and sent to output buffer 148. This alternating process is continually repeated to ensure that processor 46 does not waste time waiting for data to be inputted or outputted.

Figure 11:
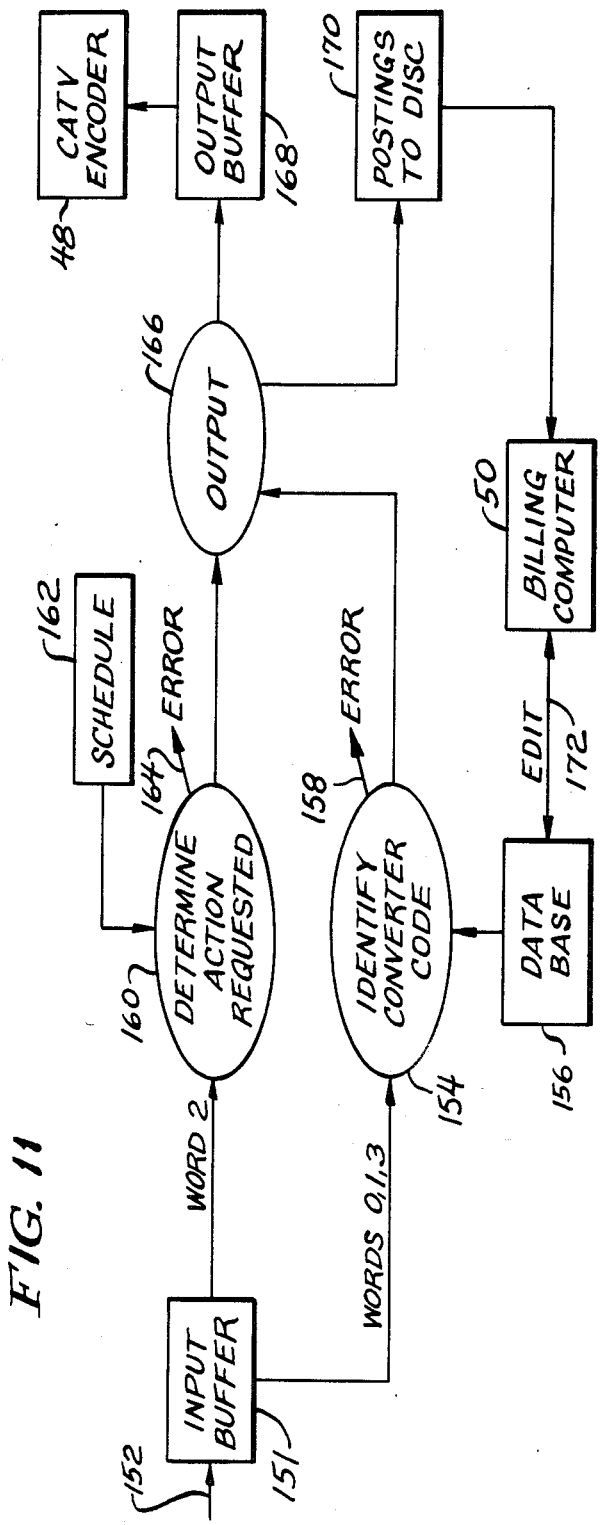
FIG. 11 is a sketch illustrating processing by the system controller, CATV encoder, and billing computer.

As mentioned, system controller 46 processes the four words sent to it by multiplexer 42 to locate ("map") the address of the one-way addressable converter for the cable subscriber initiating the IPPV call, to check the password entered by the cable subscriber and to change the authorization code in the cable subscriber's converter in order to allow him to view the cable event. FIG. 11 is a diagram which should be helpful to understand the processing which occurs at system controller 46, addressable CATV encoder 48 and billing computer 50. Data from multiplexer 42 is applied to one of the input buffers of FIG. 10 which is represented as a buffer 151 in FIG. 11 receiving an input via line 152. The inputs comprise the four words depicted in FIG. 9. These four words are used to determine the action which is to occur. Words 0, 1 and 3 are used to map the telephone number of the subscriber into the address code of his converter, as shown at 154. Referring back to FIG. 9, it will be seen that Word 0 comprises the area code and part of the telephone number of the subscriber, and Word 1 completes the telephone number of the subscriber. At 154, system controller 46 finishes mapping the telephone number to the unique address code of the converter of the cable subscriber. Word 3 is used to make sure that the password is valid or, alternatively, to determine which of several converters are to be authorized at the premises of the cable subscriber. In this mapping function, system controller 46 refers to a data base 156, discussed infra. In the event that system controller 46 cannot map the telephone number into a converter code (because, for example, of a wrongfully dialed telephone number), an error is generated at 158. That error can also be generated if the data base reflects the unavailability of the event for purchase by that particular subscriber, because of bad credit, tardy bill payments, or whatever reasons are considered to be adequate by the cable company.

Word 2 of FIG. 9 identifies the cable event which the cable subscriber wishes to purchase or to cancel. Word 2 is applied at 160 to determine the action which is requested by the subscriber. The system provides for the subscriber to either request a pay per view cable event or, if he wishes, to cancel it within a prescribed time. Referring to a schedule 162, the determination is made as to whether the cable event is requested to be turned on or off. If no such cable event is found in the schedule 162, an error 164 will be generated. Assuming that there are no errors in the determinations 154 or 160, then an authorization to program the cable subscriber's converter as well as a program tag and a program identification are provided to an output 166. From there, the information is provided to an output buffer 168 which holds information until the CATV encoder 48 processes it.

In addition, from the output 166 information including the converter identification, the program identification, and a timestamp are posted to a disk at 170 within system controller 46. Subsequently, these postings are unloaded to billing computer 50, typically on the next business day. Billing computer 50 has editing capabilities via a line 172 with data base 156. Thus, if desired by the cable company, the billing computer can edit the data base so that no cable subscriber can exceed some limitation per month on cable pay per view events. Also, the system can provide in this manner for preventing any pay per view events from being purchased by a cable subscriber while permitting normal cable operation. This will be determined by the policy of the cable company, but the present system provides the flexibility to achieve all objectives of the cable company.

Figure 12:
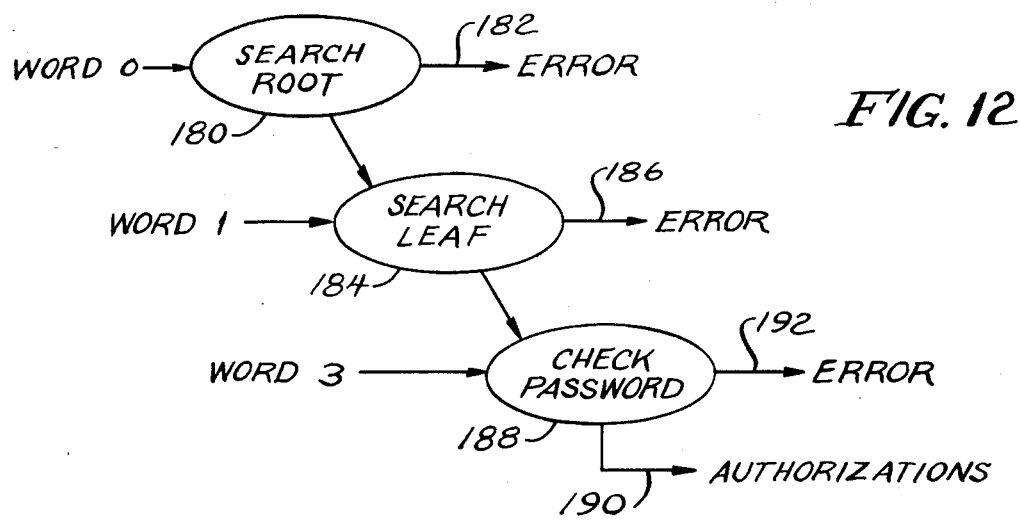
FIG. 12 is a sketch showing the two level searching used in the mapping algorithm applied in the system controller.

FIG. 12 further illustrates the mapping process occurring in system controller 46. To map the telephone number of the subscriber into an authorization code, system controller 46 preferably uses a two level tree having a root and many leaves. In the preferred system, a root corresponds to one page of memory (which is 1024 words, each 16 bits) and each leaf also is one page of memory. The root uses table searching. Thus, in FIG. 12, Word 0 is used to search the root at 180. The root usually has between 10 and 50 entries, which corresponds to the fact that the first four digits of a seven digit telephone number used by the telephone company occur in selected groups. In other words, there is a limitation used by the telephone company so that although four digits are used, there are fewer than 10,000 numbers which are actually assigned, although 10,000 are theoretically possible. This root is sometimes referred to as the PHIN root, standing for "phone index." In the event that the searching at 180 does not locate the number which has been specified by Word 0, then an error is indicated as shown at 182. However, if the root is found at 180, then Word 1 is used to search the leaf at 184. The leaf has many parts, and Word 1 is used to arrive at a correct pointer stored in the leaf. This method is referred to as direct indexing by persons skilled in the art, and is a time efficient method. The pointer will lead to the correct information for the converter of the cable subscriber who telephoned his request. In the event that the direct indexing does not locate the pointer, then an error is indicated at 186. If the pointer is found, then Word 3 is used to check the password at 188. If the password matches, then authorization can be provided at 190. If, however, the password does not match, then an error will issue at 192.

Figure 13:
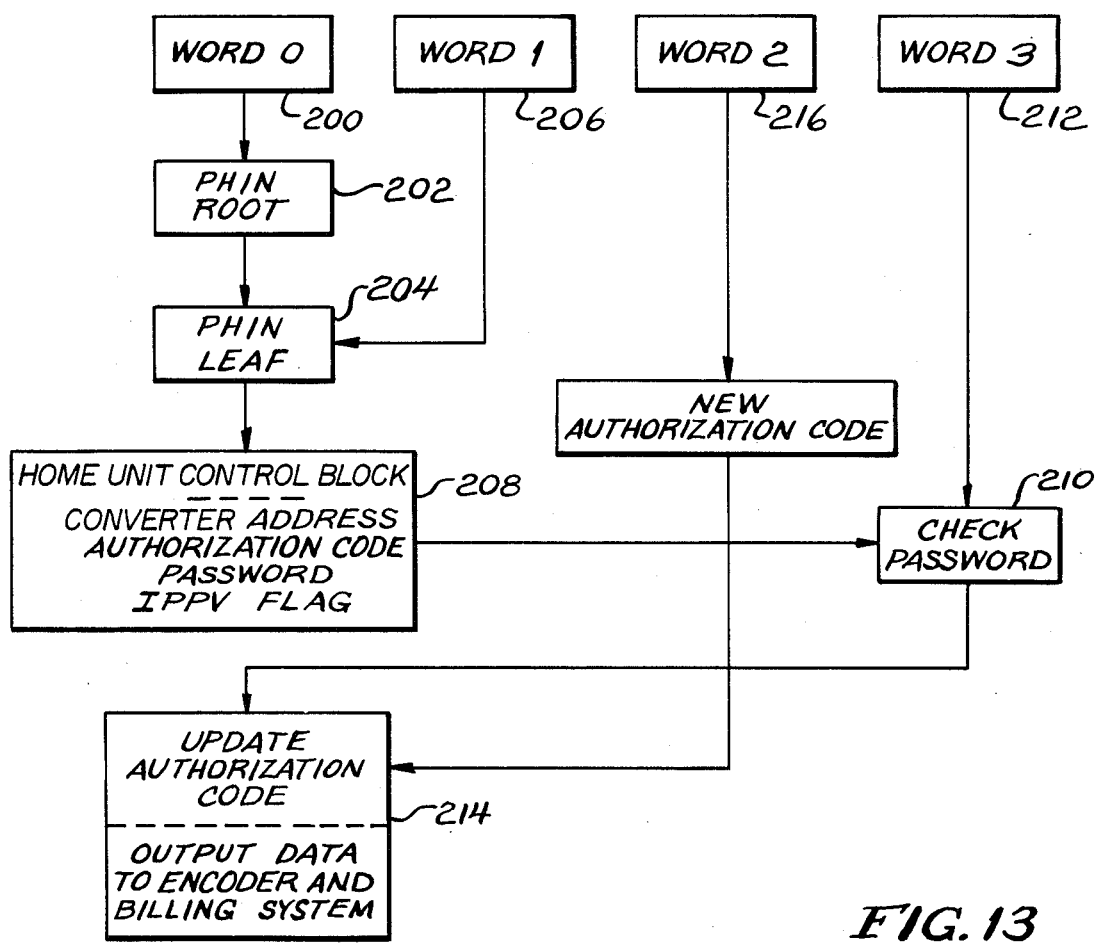
FIG. 13 illustrates further how the four words sent to the system controller are processed.

FIG. 13 illustrates the processing of the four words of FIG. 9 more particularly. Word Q at block 200, containing the two bit area code and the fourteen bit number group corresponding to the first four digits of the cable subscriber's telephone number, is used to locate within a phone index (PHIN) root 202 one of several leaves 204. Word 1 at block 206 containing the ten bits corresponding to the last three digits of the cable subscriber's telephone number is used to find the particular slot in the phone index leaf 204 containing a pointer to the unique data of interest. This points to a block 208 which contains the home unit control block (HUCB) comprising the cable subscriber's one-way addressable converter address, the current authorization code for the cable subscriber, a password and an IPPV flag. The password is then read from the home unit control block and compared at block 210 with the password contained in Word 3 which is represented by block 212. If the two passwords match, the home unit control block authorization bits are then updated at block 214 with the event number contained in Word 2 (in block 216). The new home unit control block information is then sent out to the cable subscriber's converter so that the converter will be enabled, thus allowing the viewer to view the program selected by the IPPV call. System controller 46 also downloads the necessary information to billing computer 50 so that the cable subscriber will be billed for the IPPV event.

Thus, it will be appreciated that at the cable headend station, data from multiple telephone offices are gathered, mapped into addresses and converter authorization codes (provided no errors are found), posted for billing purposes, and encoded for nearly instant updating. The mapping for each request preferably occurs in more than one step at plural locations, so the burden on the system controller is eased. As described herein, each TCC 40 converts ASCII characters for received phone numbers into binary data, and converts the ASCII characters identifying the PPV event to be purchased as well as the password into BCD. At the system controller, these data are mapped fully into converter addresses and program tags.

By the system of the present invention, there is provided a system for accepting impulse purchases from cable subscribers who do not have two-way cable TV systems. The described system is compatible with ANI passing, and accepts information provided by the telephone office ANI computer as fast as the computer can supply it. The data is automatically translated into a form usable by the system controller and communicated at a fast rate. Appropriate error checking occurs along the entire stream of data flow to ensure reliability. The requests of the cable subscribers are checked in real time, and barring any reason to forbear, the cable subscriber's cable TV addressable converter is authorized to allow the subscriber to view or cancel the cable event as desired. After the cable event is completed, the system controller clears the data base of the authorizations.

It will be appreciated from the foregoing discussion that the device at the subscriber premises, which has been variously described as a "converter," "converter bpx" or "decoder," and which has been said to be able to descramble signals, may generally referred to as an "access terminal unit."

It will be apparent that numerous modifications can be made within the scope of the present invention. The arrangement described herein is illustrative, and the scope of protection is indicated by reference to the following claims.

What is claimed is:

1. In a system including subscribers with one-way addressable access terminal units, a method for processing calling line data messages received from a telephone company serving subscribers, said calling line data messages representing subscriber requests for pay per view service, each of said calling line data messages including a subsriber's telephone number and selection data determined by a subscriber to choose a pay per view event, the method comprising the steps of:
   compressing said calling line data messages; then
   electronically mapping the telephone number portions of said calling line data messages into address codes for the access terminal units, including reorganizing at least a portion of the subscriber telephone number by reading a look-up table for a first portion of said telephone number to provide a first binary number, converting a second portion of said telephone number into a second binary number, and combining said first and second binary numbers; and
   electronically mapping the selection data portions of said calling line data messages into authorization codes for said access terminal units representative of said pay per view events.

2. The method of claim 1 wherein a calling line data message includes a two digit ASCII number, the method including converting said ASCII number into a binary number by:
   subtracting 30 hexadecimal from the ASCII digit in the one's place to produce a one's place binary value;
   subtracting 30 hexadecimal from the ASCII digit in the ten's place to produce a ten's place binary value;
   combining the ten's place binary value with a ten's place look-up table base address to produce a ten's place look-up table address;
   addressing a look-up table with the ten's place look-up table address to produce a weighted ten's place binary value; and
   adding the weighted ten's place binary value to the one's place binary value to produce the binary number equivalent to the two digit ASCII number.

3. The method of claim 1 wherein a calling line data message includes a three digit ASCII number representing the area code of a subscriber, the method including converting said ASCII number into a two bit binary value by:
   subtracting 30 hexadecimal from the first ASCII digit to produce a firs binary value;
   subtracting 30 hexadecimal from the second ASCII digit to produce a second binary value;
   rotating the second binary value left four places to produce a rotated second binary value;
   adding the first binary value to the rotated second binary value and storing the sum in a first register location;
   subtracting 30 hexadecimal form the third ASCII digit to produce a third binary value;
   adding a look-up table base address to the third binary value and storing the sum in a second register location;
   combining the values stored in the first and second register location to produce a register pair; and
   addressing a memory with the register pair to locate the two bit binary value corresponding to the ASCII area code value.

4. The method according to claim 1 wherein said first portion of said subscriber telephone number comprises an areas code and wherein said first binary number has a relatively small number of bits.

5. The method according to claim 1 wherein said compressing step includes stripping data from said calling line data messages at a communication unit corresponding to a telephone company central office, the method further including buffering the portions of said calling line data messages after said stripping step, and thereafter transmitting said buffered portions to a headed station for said mapping steps.

6. The method according to claim 5 wherein said method further includes receiving said buffered portions at said headend station at a communication controller, said communication controller converting at least a portion of the subscriber telephone number into binary form.

7. The method according to claim 6 wherein said communication controller converts said selection data into a binary format.

8. The method according to claim 6 wherein said step of mapping the telephone number employs multi-level indexing.

9. The method according to claim 6 wherein said method includes applying data from said communication controller to a system controller, said mapping steps occurring at said system controller.

10. The method according to claim 9 wherein said subscriber telephone number and said selection data are both converted into binary form prior to being received at said system controller.

11. The method of claim 6 wherein said communication controller performs said reorganizing step.

12. In a system including subsribers with one-way access terminal units, a method for processing calling line data messages received from a telephone company serving subscribers, said calling line data messages representing subscriber requests for pay per view service, each of said calling line messages including a subscriber's telephone number and selection data determined by a subscriber to choose a pay per view event, the method comprising the steps of processing each of said calling line data messages to form:

a first number group comprising four digits of the telephone number;

a second number group comprising three other digits of the telephone number;

a third number group comprising the area code of the telephone number; and a fourth number group comprising the selection data and electronically mapping said four number groups into address codes and authorization codes for said access terminal units, so that said units can be addressed and authorized to permit said pay per view event to be exhibited.

13. The method of claim 12 including:

forming a first data word from said first and third number groups;

forming a second data word from said second number group;

forming a third data word form said fourth number group; and forming a fourth data word from said fourth number group.

14. The method of claim 12 further including forming first, second, third and fourth data words from said number groups.

15. The method of claim 14 wherein said first and second data words are in binary form and said third word comprises binary coded decimal data.

16. The method according to claim 14 including searching a root stored in a memory in accordance with said first data word and searching a leaf stored in said memory in accordance with said second data word.

17. The method according to claim 14 wherein the method includes:

using four digits of the telephone number to identify one of several leaves within a phone index root;

using three other digits of the telephone number for locating a pointer within the identified leaf;

using said pointer to obtain a block of data stored in a memory including the address of, an access terminal unit and the current authorization code for a subscriber; and updating said block of data in accordance with the selection data.

18. The method according to claim 17 further including obtaining a password from said block of data, said password having been stored in a data base;

comparing the obtained password with a password contained in said selection data to determine whether the password in said selection data matches the stored password; and if there is a match, the updating the authorization code for the subscriber.

19. The method according to claim 18 further including determining whether a flag has been set in the block of data corresponding to the subscriber, and refraining from updating information if said flag has not been set.

20. The method according to claim 12 wherein each of said calling line data messages is in ASCII format, and wherein the method includes:

converting the first number group into a first binary word and converting the second number group into a second binary word.

21. In a system including subscribers with one-way addressable access terminal units, a method for processing calling line data messages received from a telephone company serving the subscribers, said calling line data messages representing subscriber requests for pay-per-view service, each of said calling line data messages including the subscriber's telephone number and selection data determined by a subscriber to choose a pay per view event, said subscriber telephone number including an area code, the method comprising the steps of:

receiving said calling line data messages and compressing and converting the subscriber's telephone numbers and selection data into a binary form, including converting the area code of said subscriber telephone number into a binary number having a relatively small number of bits by using a look-up table and thereafter applying said binary form data to a system controller;

electronically mapping said binary form telephone numbers into address codes for said subscribers at a system controller; and electronically mapping said selection data in binary form into codes for said access terminal units.

22. The method according to claim 21 wherein the area codes of said subscribers are converted into two binary bits via said look-up table at a communication controller.

23. The method according to claim 21 wherein said step of compressing and converting occurs at a communication controller located at a cable headend station.

24. The method according to claim 23 further comprising receiving said calling line data messages and stripping data therefrom.

25. The method according to claim 24 wherein said calling line messages after said stripping step are buffered.

26. The method according to claim 23 wherein said communication controller performs said step of converting the area code of said subscriber telephone number into a binary number said communication controller coupling said area code information in binary form to said system controller.

27. The method according to claim 23 wherein said communication controller converts each said subscriber telephone number into a multiple bit binary number and communicates said binary number to said system controller, and wherein said system controller uses said multiple bit binary number for root searching in said step of mapping the telephone number.

28. The method according to claim 23 wherein said communication controller converts the three digits of the area code of said subscriber telephone number into a relatively small number of binary bits, converts a group of four digits of said subscriber telephone number into a second binary numbers to said system controller.

* * * * *